March 21, 1961 H. ROBERTS 2,975,848
PORTABLE POWER DRIVEN DEVICE FOR BORING HOLES
Filed June 27, 1958 2 Sheets-Sheet 1
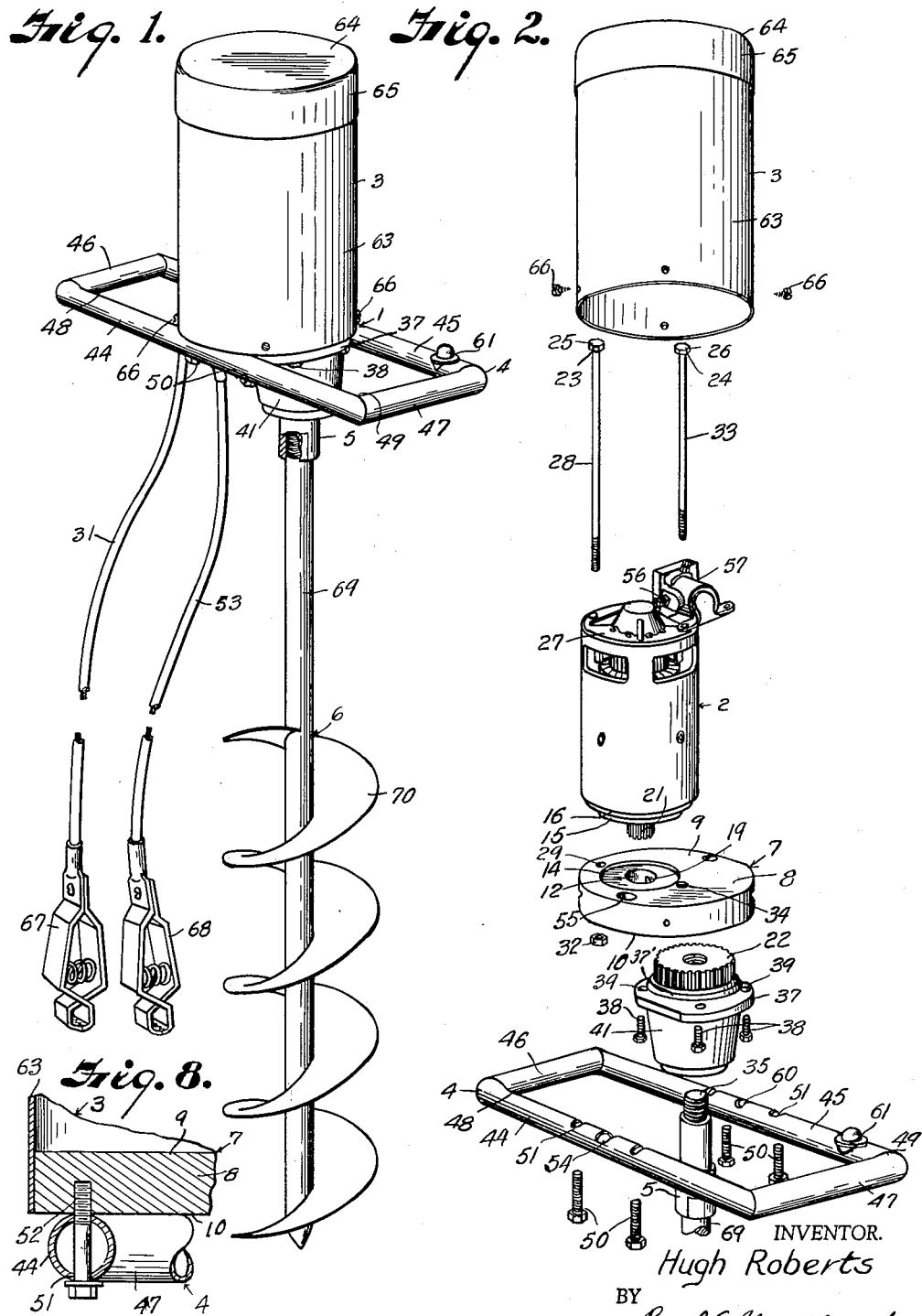
INVENTOR.
Hugh Roberts
BY
Paul E. Mullendore
ATTORNEY March 21, 1961　　　　H. ROBERTS　　　　2,975,848
PORTABLE POWER DRIVEN DEVICE FOR BORING HOLES
Filed June 27, 1958　　　　　　　　　　　　2 Sheets-Sheet 2
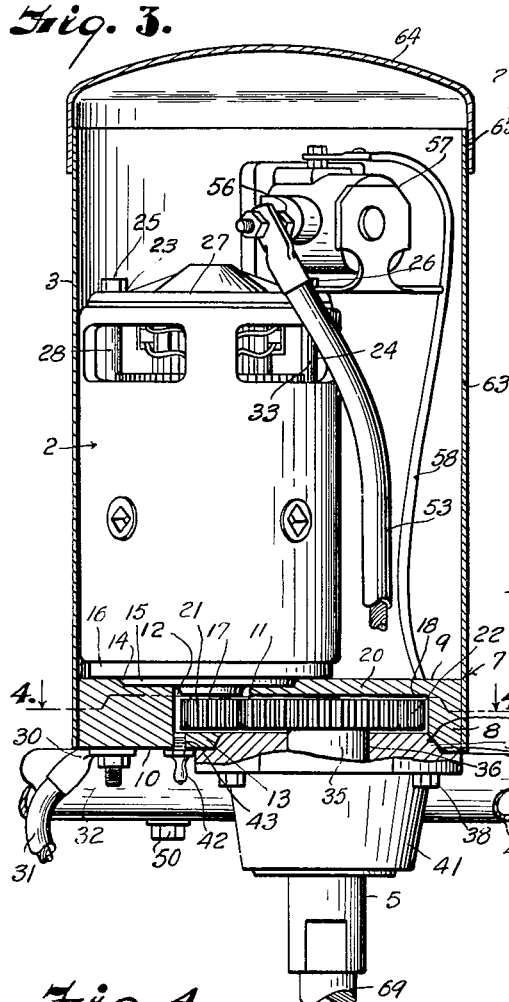
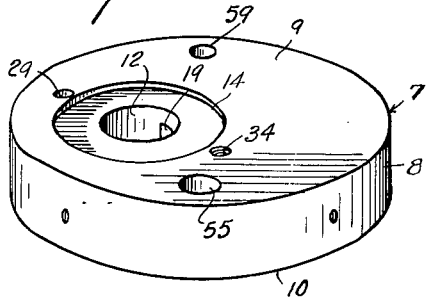
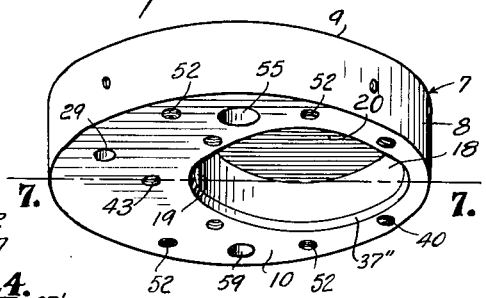
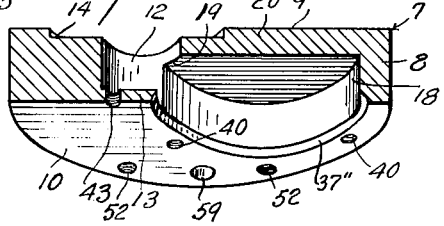
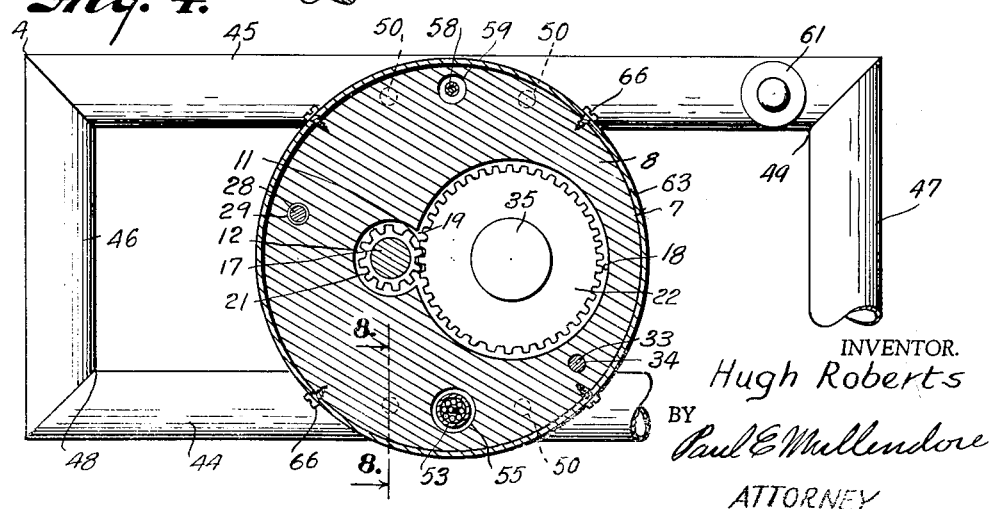
INVENTOR.
Hugh Roberts
BY
Paul E. Mullendore
ATTORNEY United States Patent Office 2,975,848
Patented Mar. 21, 1961

2,975,848

PORTABLE POWER DRIVEN DEVICE FOR BORING HOLES

Hugh Roberts, Enid, Okla., assignor to Machinery and Electrical Products Co., Inc., Enid, Okla., a corporation of Oklahoma Filed June 27, 1958, Ser. No. 745,131

3 Claims. (Cl. 175—192)

This invention relates to a portable power driven device for boring holes for setting post holes and the like, and has for its principal object to provide a device of this character having a rugged, compact and light weight construction, so that it can be easily handled and manipulated by one man.

Other objects of the invention are to provide a hole boring device wherein the torque and reaction forces are applied through a substantially rigid thrust member or mounting plate, which provides a common mounting for the prime mover and the auger actuated thereby, and which also provides for attachment of a handle member for holding the device and applying a hold-down pressure to the auger; to provide a simple gear reduction whereby the gears are adapted to be completely contained within the mounting member; to provide a mounting member forming substantially thick walls for protecting the gearing; and to provide a mounting member which results in a better balanced mechanism and whereby greater pressure may be applied to the auger without damaging the gearing or the prime mover which is attached thereto.

Other objects of the invention are to provide a structure wherein the prime mover, such as an electric motor, may be enclosed in a thin light weight metal casing; to provide a unit device having a minimum of exposed wiring; and to provide a structure requiring a minimum amount of lubricant and which eliminates resistance to rotation of the gears because of fluid dynamics.

In accomplishing these and other objects of the invention as hereinafter pointed out, I have provided improved structure, the preferred form of which is illustrated in the accompanying drawings, wherein:

Fig. 1 is a perspective view of a portable power driven device constructed in accordance with the present invention.

Fig. 2 is a perspective view of the parts of the device, shown in disassembled, spaced relation, to better illustrate the construction.

Fig. 3 is an enlarged section through the upper portion of the device, particularly illustrating the speed reduction gears and enclosure thereof in the mounting member.

Fig. 4 is a horizontal section on the line 4—4 of Fig. 3.

Fig. 5 is a perspective view of the thrust or mounting member of the device as viewed from the upper side thereof.

Fig. 6 is a similar view from the under side of the thrust or mounting member.

Fig. 7 is a diametrical section through the thrust or mounting member taken on the line 7—7 of Fig. 6.

Fig. 8 is a fragmentary section on the line 8—8 of Fig. 4, to better illustrate attachment of the handle member to the thrust or mounting member of the device.

Referring more in detail to the drawings:

1 designates a portable power driven device for boring holes, for example, in the setting of poles, fence posts, planting shrubbery, and similar uses. The device illustrated has a prime mover, such as a motor 2, a casing 3 for enclosing the motor, a handle member 4, a chuck 5, and a tool element, such as an auger 6, all attached to a thrust or mounting member 7, to provide a unitary structure.

The thrust or mounting member 7 constitutes an important part of the invention and comprises a relatively thick metal plate 8 of circular contour and which has generally flat upper and lower faces 9 and 10. The plate 8 is of ample thickness to be extremely rigid for attaching the motor 2 on the face side 9, the handle member 4 on the face side 10, and for providing a housing for enclosing a speed reduction gearing 11 (Figs. 3 and 4), as now to be described.

The upper face 9 at one side of the axial center of the plate 8 has a bore or recess 12 terminating short of the face 10 to provide a substantial wall thickness 13 at the end of the bore. The bore 12 is counterbored on the face side 9 to provide a shallow counter-recess 14 for seating an annular shoulder 15 on the lower head plate 16 of the motor 2, and whereby the power shaft 17 of the motor is retained in coaxial relation with the bore 12.

Formed in the opposite diametrical side of the plate 8, and extending inwardly from the face 10, is a larger bore or recess 18, having one side thereof intersecting the smaller bore 12, to provide a lateral opening 19 therebetween, as best shown in Figs. 3 and 7. The bore 18 terminates short of the upper face 9 to provide a wall 20 of substantial thickness. The bores 12 and 18 thus constitute laterally interconnected recesses for containing a pinion gear 21 on the power shaft 17 of the motor and a larger driven gear 22, the teeth of the gear 22 meshing with the teeth of the pinion gear 21 through the opening 19.

The motor 2 is preferably an electrical motor and is attached to the plate 8 by bolts 23 and 24 having heads 25 and 26 seated against the upper end plate 27 at the opposite end of the motor. The bolt 23 has a shank 28 of sufficient length to extend through the end plates 27 and 16 of the motor and through an opening 29 in the plate 8 for attaching the ground terminal 30 of an electrical conductor 31. The ground terminal 30 and motor are clamped to the plate 8 by a nut 32 that is threaded onto a projecting end of the bolt shank 28. The other bolt 24 has a shank 33 of shorter length and is threaded into an internally threaded socket 34 in the plate 8. With the bolts 23 and 24 tightened, the shoulder portion 15 of the motor is drawn into the counterbore 14 to seat the motor and retain the pinion 21 firmly in the center of the bore 12, as best shown in Fig. 3.

The driven gear 22 is attached to a shaft or hub 35 of the chuck 5. The shaft extends through an opening 36 of a closure plate or flange 37 that covers the open bottom of the bore 18 and which is secured to the plate 8 by fastening devices, such as cap screws 38, that extend through suitable openings 39 in the closure plate 37 and into threaded openings 40 of the plate 8. The closure plate 37 also carries a bearing housing 41 that depends therefrom and which carries the bearing and an oil seal (not shown) for journaling and sealing the hub or shaft of the chuck 5.

In order to center and more firmly secure the bearing housing, the plate 37 has a tapered annular shoulder 37' that fits within a tapered annular counter-recess 37" of the bore or recess 18.

It is thus obvious that the head plate 16 of the motor 2 cooperates with the closure plate 37 and the walls of the bores 12 and 18 to completely enclose the pinion 21 and driven gear 22 and to retain a lubricant in the recesses for lubricating teeth of the gears and bearing parts of the device. The lubricant is supplied through a pressure fitting 42 that is threaded into an opening 43 in the under side of the plate 8 to connect with the lubricant space surrounding the gears. It is thus obvious that the working parts may be lubricated with a small amount of lubricant, so as not to interfere with rotation of the gears.

The handle or holding member 4 includes laterally spaced parallel tubular bars 44 and 45 connected at the ends by bars 46 and 47 to provide laterally projecting handles 48 and 49 (Fig. 1). The handle member 4 is attached to the under side of the plate 8 by fastening devices such as cap screws 50 that extend through openings 51 in the side bars 44 and 45 and into internally threaded recesses 52 in the plate 8.

The other electrical conductor 53 which is required for supplying current to the motor 2 extends through an opening 54 in the bar 44 and a registering opening 55 in the plate 8 to connect with a terminal 56 of a relay switch 57 that is secured to the upper end of the motor by the bolt 24 and which is connected with a relay circuit including a conductor 58 that extends from the relay switch 57 downwardly alongside the motor and through an opening 59 in the plate 8 and through a registering opening 60 in the handle bar 45 to connect with a starting switch 61 that is mounted in the outer end of the bar 45, as best shown in Figs. 1 and 4.

The motor 2, including the wiring therefor, is enclosed in the casing 3. The casing 3 is constructed of light gauge metal and includes a cylindrical wall portion 63, having one end sleeved over the periphery of the plate 8, and which extends upwardly over the sides of the motor, the upper end of the wall portion 63 being closed by a cap 64 that has an annular flange 65 sleeved thereover and secured by welding or the like. The lower end of the cylindrical wall is attached to the plate 8 by fastening devices such as screws 66. The conductors 31 and 53 may be connected to a suitable source of current supply, preferably the terminals of a battery (not shown) by means of spring clamps 67 and 68. The plate 37 and housing 41 constitute a bracket in which the chuck 5 is carried to make connection with the auger 6 or similar tool.

The auger 6 comprises a shaft 69 that is suitably connected with the chuck 5 and has a spiral flight 70 thereon. While an auger is illustrated, it is obvious that other types of tools might be substituted, such as a twist drill or various types of bits.

In assembling the device, the motor may be first mounted on the plate 8, with the shoulder 15 seating in the counterbore 14, in which position the pinion 21 is in the center of the bore 12. The bolts 23 and 24 are then applied to secure the motor to the mounting member 7. The shank 28 of the bolt 23 is projected through the opening 29. The terminal 30 of the ground conductor 31 is applied over the projecting end of the bolt and followed by the nut 32. The other bolt, 24, is turned into the threaded socket 34 and drawn tight.

The conductor 58, which forms a part of the relay circuit, is passed through the openings 59 and 60 and threaded through the tubular bar 45 to connect with the switch 61. The other main conductor, 53, is passed through the openings 54 and 55 and connected with the terminal 56 of the relay switch. The conductor 58 is also connected with the relay switch to complete the electrical connections.

The chuck 5 is rotatably mounted in the housing 41, and the driven gear 22 is connected with the part 35 of the chuck. The assembly is then moved into position with the driven gear 22 passing into the bore 18 so that the teeth thereof mesh with the teeth of the pinion 21 by way of the opening 19. The plate or flange 37 with the tapered shoulder 37' fitting in the tapered counter-recess 37", after which the plate 37 is secured to the mounting member 7 upon application of the cap screws 38. The holding member 4 is then passed over the chuck and secured to the underneath side of the mounting member by the cap screws 50. The shaft 69 of the auger may then be connected with the chuck 5 to complete the assembly. A quantity of lubricant is supplied under pressure through the fitting 42 to fill the space surrounding the gears 21 and 22.

In using the device, the spring clamps 67 and 68 on the ends of the conductors are connected with the terminal posts of a storage battery (not shown) or other source of current supply, and the device is ready for operation. The hands of the operator grip the handles 48 and 49 of the holding frame and the point of the auger is placed over the site of a hole to be drilled. The switch 61 is then operated to effect energization of the motor. The motor rotates the pinion 21, gear 22, and the chuck 5 at a lower speed by reason of the differential in size of the pinion and the driven gear 22.

With the auger in rotation, a hold-down pressure is applied by the operator through the handles 48 and 49 to cause the auger to penetrate the ground and form the bore hole. During rotation of the auger, the reaction force is applied through the thrust or mounting member 7 to the holding member and is resisted by the operator. Also, the holding member takes the driving thrust between the motor and the auger. Upon completion of the hole, the circuit is opened through the switch 61, and the auger is lifted from the bore hole.

From the foregoing, it is obvious that the invention provides a device which is of rugged, compact and light weight construction, so that it can be easily handled and manipulated by one man. It is also obvious that the torque and reaction thrusts are taken by the substantially rigid mounting member, with the result that the motor casing and other light weight parts are relieved from such stresses and torque. It is also obvious that the gears are enclosed by the rigid mounting member, so that they are free and independent of the hold-down pressure.

What I claim and desire to secure by Letters Patent is:

1. An apparatus of the character described, including a tool, a motor having a driving shaft for driving the tool, a plate of substantial thickness for taking the reaction forces between the motor on one side of the plate and the tool on the opposite side of the plate, said plate having a recess extending inwardly from the motor side of the plate and having a laterally offset recess extending inwardly from the opposite side of the plate, said recesses intersecting each other in providing a connection between said recesses, means for attaching the motor to said plate in covering relation with said first named recess and with the driving shaft extending therein, a pinion gear in said first named recess and fixed to the motor shaft and having teeth extending into the intersecting connection between the recesses, a driven gear in the second named gear recess and having teeth meshing with the teeth of the pinion gear in said intersecting connection, a bearing housing covering the driven gear and having an annular flange lapping the face side of the plate, a driven shaft having rotatable support in the bearing housing and connected with the driven gear for rotating the tool, fastening devices extending through said flange and into the plate for securing the bearing housing, and a holding member including spaced apart bars fixed to the plate on opposite sides of the bearing housing.

2. An apparatus of the character described, including a digging auger, a motor having a driving shaft for driving the auger, a plate of substantial thickness for taking the reaction forces between the motor on one side of the plate and the digging auger on the opposite side of the plate, said plate having a recess extending inwardly from the motor side of the plate and having a laterally offset recess extending inwardly from the opposite side of the plate, said motor having a head plate provided with an annular shoulder encircling the driving shaft, said recesses intersecting each other in providing a connecting opening between said recesses and having counter-recesses, means for attaching the motor to said plate in covering relation with the first named recess and with the shoulder engaging within the counter-recess thereof and the driving shaft of the motor extending into said first named recess, a pinion gear in said first named recess and fixed to the driving shaft and having teeth extending into the connecting opening between the recesses, means for attaching the motor to said plate, a driven gear in the second named recess and having teeth meshing with the teeth of the pinion gear in said connecting opening, a bearing housing covering the driven gear and having an annular flange lapping the face side of the plate and having an annular shoulder engaging the counter-recess thereof, a driven shaft rotatable in the bearing housing and connected with the driven gear for operating the digging auger, fastening devices extending through said flange and into the plate for securing the bearing housing, and a holding member including spaced apart bars fixed to the plate on opposite sides of the bearing housing.

3. An apparatus of the character described, including a digging auger, a motor having a driving shaft for driving the auger, a plate of substantial thickness for taking the reaction forces between the motor on one side of the plate and the digging auger on the opposite side of the plate, said plate having a recess extending inwardly from the motor side of the plate and having a laterally offset recess extending inwardly from the opposite side of the plate, said recesses intersecting each other in providing a lateral connection therebetween, means for attaching the motor to said plate in covering relation with the first named recess and with the driving shaft of the motor extending into said first named recess, a pinion gear in said first named recess and fixed to the motor shaft and having teeth extending into the intersecting connection of said recesses, a driven gear in the second named recess and having teeth meshing with the teeth of the pinion gear in said intersecting connection, a bearing housing covering the driven gear and having an annular flange lapping the face side of the plate in closing relation with the second named recess, a driven shaft having rotatable support in the bearing housing and connected with the driven gear for rotating the digging auger, fastening devices extending through said flange and into the plate for securing the bearing housing, a holding member including spaced apart bars extending across the face of the plate on opposite sides of the bearing housing, and fastening devices extending through said bars and into the plate for attaching the holding member to take reaction forces directly through said plate.

References Cited in the file of this patent

UNITED STATES PATENTS

| | | |
|---|---|---|
| 2,525,839 | Sparklin | Oct. 17, 1950 |
| 2,562,276 | Kandle | July 31, 1951 |
| 2,846,192 | Ostling | Aug. 5, 1958 |
| 2,905,440 | Gerentes | Sept. 22, 1959 |
| 2,914,305 | Wink | Nov. 24, 1959 |